United States Patent [19]
Richard

[11] Patent Number: 5,901,174
[45] Date of Patent: May 4, 1999

[54] EQUALIZER-COMBINER FOR DIVERSITY RECEIVER, RECEIVER INCORPORATING SAME AND CORRESPONDING DIVERSITY RECEPTION METHOD

[75] Inventor: Joël Richard, Taverny, France

[73] Assignee: Alcatel Telspace, Nanterre Cedex, France

[21] Appl. No.: 08/878,620

[22] Filed: Jun. 19, 1997

[30] Foreign Application Priority Data

Jun. 21, 1996 [FR] France ................................. 96 07750

[51] Int. Cl.[6] .............................. H03H 7/30; H03H 5/00; G06F 17/10
[52] U.S. Cl. ...................... 375/229; 333/28 R; 364/724.2
[58] Field of Search .................... 375/229, 230, 375/233, 235; 333/28 R; 364/724.012, 724.19, 724.2

[56] References Cited

U.S. PATENT DOCUMENTS

| | | | |
|---|---|---|---|
| 4,972,434 | 11/1990 | Le Polozec et al. | 375/232 |
| 5,027,371 | 6/1991 | Sehier et al. | 375/235 |
| 5,319,677 | 6/1994 | Kim | 375/347 |
| 5,483,557 | 1/1996 | Webb | 375/349 |
| 5,499,272 | 3/1996 | Bottomley | 375/347 |
| 5,644,597 | 7/1997 | Ueda | 375/229 |

FOREIGN PATENT DOCUMENTS

0631399A1  12/1994  European Pat. Off. .

OTHER PUBLICATIONS

Liu Qingli et al, "Performance of Decision–Feedback Equalizers with Dual Antenna Diversity", *Personal Communication–Freedom Through Wireless Technology*, Secaucus, NJ, May 18–20, 1993, No. Conf. 43, May 18, 1993, Institute of Electrical and Electronics Engineers, pp. 637–640.

*Primary Examiner*—Chi H. Pham
*Assistant Examiner*—Khai Tran
*Attorney, Agent, or Firm*—Sughrue, Mion, Zinn, Macpeak & Seas, PLLC

[57] ABSTRACT

An equalizer-combiner for a diversity receiver using at least two receive channels computes equalization coefficients for each channel allowing for a first channel error signal representative of a comparison between the demodulated signal and a channel estimate of the transmitted source signal delivered by a channel estimator fed with the demodulated signal in the channel during an acquisition phase and a second channel error signal representative of a comparison between the demodulated signal and the global estimate of the transmitted source signal during a normal operation phase. The equalizer-combiner computes the weighting coefficients allowing for a first global error signal representative of a comparison between the combined signal and the global estimate of the source signal during the acquisition phase a second global error signal representative of a comparison between local reference information known to the receiver and corresponding received reference information periodically extracted from the global estimate during the normal operation phase.

11 Claims, 3 Drawing Sheets

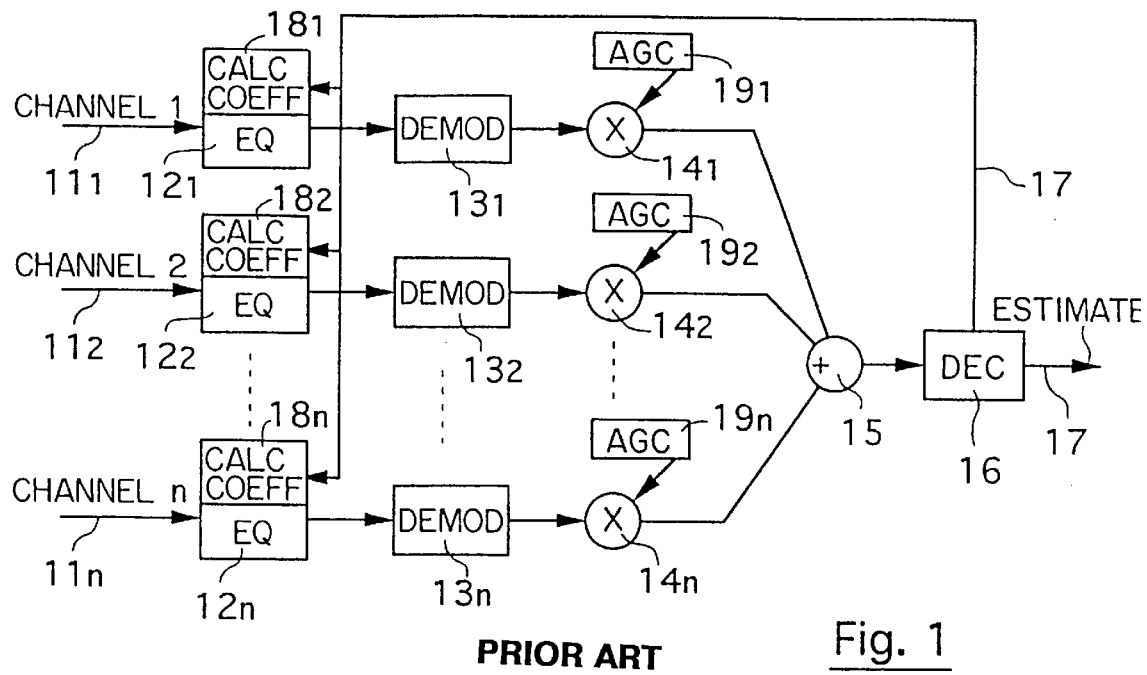
PRIOR ART  Fig. 1
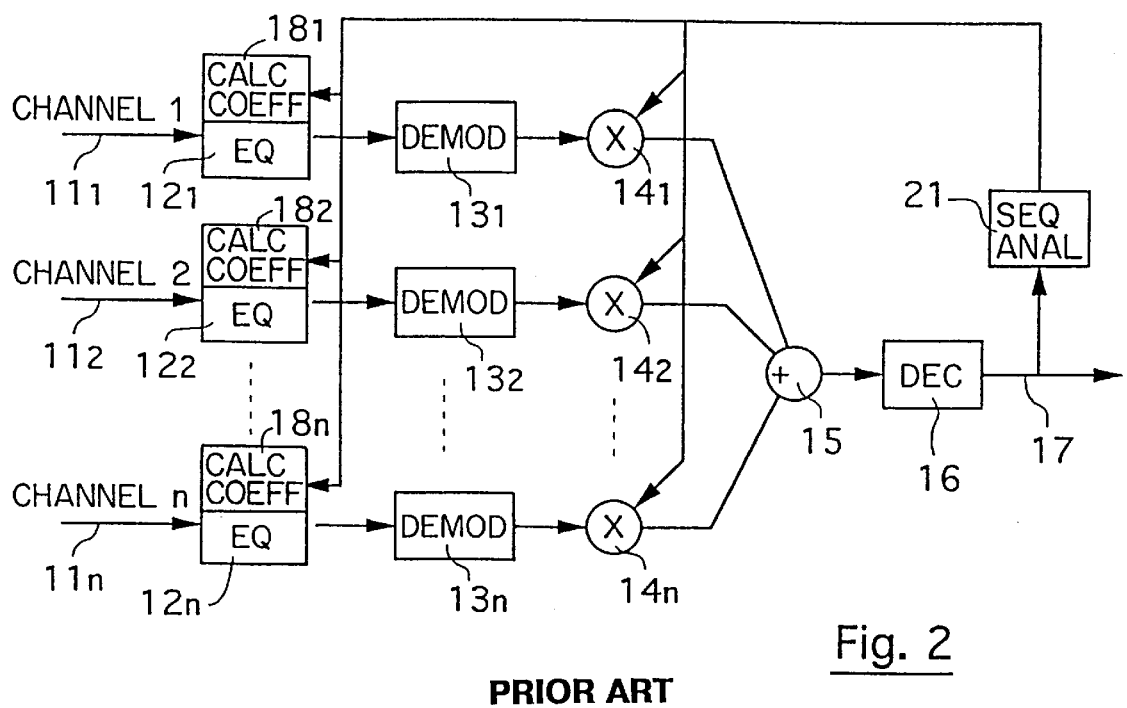
Fig. 2
PRIOR ART

EQUALIZER-COMBINER FOR DIVERSITY RECEIVER, RECEIVER INCORPORATING SAME AND CORRESPONDING DIVERSITY RECEPTION METHOD

BACKGROUND OF THE INVENTION

1. Field of the Invention

The field of the invention is that of diversity signal reception. To be more precise, the invention concerns the equalization and the combination of signals received on the different channels of a diversity receiver. It applies with advantage to all selective and/or scrambled transmission media.

2. Description of the Prior Art

A preferred field of application of the invention is that of tropospheric transmission. A transmission medium of this kind is conventionally subject to Rayleigh fading (deep and fast, up to 15000 dB/s). It is also highly frequency selective, the coherence band of the transmission medium often being less than the transmitted bit rate.

Diversity reception is based on receiving the same source signal on a plurality of separate channels (at least two). Each of these channels is processed (equalized) independently. They are then combined (weighted sum). The combined signal is then conventionally processed to reconstruct the transmitted signal as reliably as possible.

In the case of tropospheric transmission, diversity is assured by simultaneous transmission of the same signal on as many carrier frequencies as there are channels It can also be achieved by spatial arrangement of a plurality of antennas near the receiver.

Diversity equalization-combination is subject to a number of problems, especially in tropospheric transmission.

At low signal/noise ratios, the equalizers tend to become desynchronized or to have difficulties with converging, because of decision errors in estimating the received information, which serves as a criterion for equalization.

It is very difficult to synchronize the equalizers before diversity combination. The differential propagation tiredelays between diversity channels rule out the "fixing" of a coefficient called the central coefficient. The resulting degree of freedom has to be compensated by another constraint for combination in phase.

To be more precise, on a highly selective transmission medium the various channels can have relative time-delays exceeding the transmitted signal period. On summation (combination), the various channels have to be synchronized. The computation is unstable and subject to catastrophic propagation (interaction of equalizers), a problem that it avoided or made less severe by using a slow algorithm.

There are three major classes of combiners, namely:
selection combiners:
output=max $(p_1;p_2 \ldots ;p_n)$ $P_i=1$: power of signal on channel i $S/N_{output}=\max((S/N)_1)$
equal gain combiners:
output=$p_1+p_2 + \ldots p_n$
if $S_1=S_2=S_n$ $S/N_{output}=(S/N)_{i*n}$
if $S_1=0$ for $i<>k$ $S/N_{output}=(S/N)_{k/n}$
optimal combiners:
output=$a_1p_1+a_2p_2 + \ldots +a_np_n$ with $a_i=K*(S/N)_i$
$S/N_{output}=(S/N)_1+(S/N)_2 + \ldots (S/N)_n$
where m is the diversity order or number of channels.

The selection combiner does not offer any combination gain. Its output is simply equal to the best input.

The equal gain combiner causes all channels to contribute, whether they enhance or degrade the combined signal.

The optimal combiner maximizes the signal/noise ratio. The problem is to evaluate this ratio on each channel.

FIG. 1 shows an equalizer-combiner of a type known in itself in which the combiner is an optimal combiner.

Each channel $11_1$ through $11_n$ feeds an equalizer $12_1$ through $12_n$ and then a demodulator $13_1$ through $13_n$ and a weighting device $14_1$ through $14_n$. The weighted signals are combined by a summing device 15 which feeds a decision module 16 supplying an estimate 17 of the received signal for the remainder of the processing.

The equalization coefficients are determined by computation modules $18_1$ through $18_n$ according to the estimate 17 of the received signal.

weighting before combination can be controlled:
either by the same information 17. In this case the equalizer itself acts as a weighting device. The desynchronization of the channels, or the poor quality of one channel, then causes the equalizer to diverge from the channel, which unbalances the combiner, which causes decision errors on the combiner channel, which causes the other equalizers to diverge, and so on.

or by external information, such as an AGC voltage $19_1$–$19_N$, a noise measurement, etc. External information of this kind may be subject to caution primarily in the case of limited equalizer correction capacity or in the presence of a scrambler leading to AGC capture. It does not necessarily represent the quality of the channel.

When using a measurement of the received power (P=S+N; if N is fixed, then a=K*S), the problem (and the source of error) is to evaluate S in the measurement of P. The system is sensitive to the variation of N, to scrambling and to distortion (non-integrity of S).

In the case of noise measurement after AGC amplification (P=S+N=Constant and a=K/N) the noise measurement is done out of band, leading to errors. Moreover, the system is sensitive to the selectivity of the propagation medium, to scrambling, to distortion and to out-band spectrum pollution.

To overcome these problems so-called "reference directed" equalizers have been developed, relying on the insertion at the transmitter end of a reference sequence which is known at the receiver end. The coefficients of the equalizers and of the combiner are computed using only these reference symbols.

A device of this kind is shown in FIG. 2. The device 21 for analyzing the reference sequence drives the weighting devices $14_1$ through $14_n$ and the modules $18_1$ through $18_n$ for computing the equalization coefficients.

A disadvantage of this technique is that when the channel varies at a fast rate, the overhead due to the reference sequencer can become prohibitive, especially if the convergence algorithm is slow (a gradient algorithm is frequently chosen for reasons of simplicity, robustness and stability).

Moreover, it requires the periodic transmission of a relatively long reference sequence representing a significant loss of usable bit rate.

A particular objective of the invention is to overcome these various drawbacks of the prior art.

To be more precise, one objective of the invention is to provide an equalizer-combiner for diversity receivers offering equalization and combination (weighting) performance better than systems known in themselves.

Accordingly, an objective of the invention is to provide an equalizer-combiner of this kind capable of operating at a very low level. In particular, equalizers of the invention must not be subject to any threshold effect or to any desynchronization.

Another objective of the invention is to provide an equalizer-combiner of this kind which synchronizes the various receive channels in a simple and efficient manner, even on a highly dispersive transmission medium.

Another objective of the invention is to provide an equalizer-combiner of this kind that is capable of eliminating a faulty channel or strongly limiting a channel of poor quality.

Another objective of the invention is to provide an equalizer-combiner of this kind which does not require any significant reduction of usable transmission bit rate.

SUMMARY OF THE INVENTION

These objectives, and others that emerge below, are achieved in accordance with the invention by means of a diversity receiver equalizer-combiner using at least two receive channels each receiving a received digital signal corresponding to a single transmitted digital signal, each of the receive channels including:

an equalizer controlled by means for computing equalization coefficients and delivering an equalized signal, a demodulator fed with the equalized signal and delivering a demodulated signal, and a weighting device receiving the demodulated signal and delivering a signal weighted in accordance with a weighting coefficient, the weighted signals being then combined by a diversity summing device delivering a combined signal and feeding a global estimator which delivers a global estimate of the transmitted source signal, wherein the means for computing equalization coefficients for each of the channels allow for:

a first channel error signal representative of a comparison between the demodulated signal and a channel estimate of the transmitted source signal, delivered by a channel estimator fed with the demodulated signal in the channel during an acquisition phase, and a second channel error signal representative of a comparison between the demodulated signal and the global estimate of the transmitted source signal during a normal operation phase, and wherein the equalizer-combiner includes means for computing the weighting coefficients allowing for:

a first global error signal representative of a comparison between the combined signal and the global estimate of the source signal during the acquisition phase, and a second global error signal representative of a comparison between local reference information known to the receiver and corresponding received reference information periodically extracted from the global estimate during the normal operation phase.

Thus in accordance with the invention there are two separate phases: p1 in phase 1 (acquisition):

the equalizers converge from the error computed from the difference between their own decision and their own equalizer signal;

the combiner converges from the combined error computed from its decision (estimate);

in phase 2 (normal operation):

the equalizers "track" on the basis of the error computed from the difference between the combined decision (therefore of best quality) and their own equalized signal;

the combiner "tracks" on the basis of the error computed from the difference between the combined received reference signal and the local reference (reliable information).

Unlike the usual method (transmission medium estimation, proportionality to AGC voltages), which tend to compensate the transmission medium, the computation of the weighting coefficients by the invention tends to maximize the quality of the transmitted signal by measuring the error on it (at certain times).

This technique procures optimal operation, even at very low levels (in particular, there is no threshold effect and no desynchronization). In the absence of any signal the equalizer remains stable and re-convergence is immediate).

In the absence of any signal the equalizer receives only noise, which averages out to zero, and does not converge towards pseudo-equilibrium (auto-stable position) because it is constrained to search for the information provided by the combiner (in the normal operation phase).

As soon as there is a little signal, the convergence of the equalizer resumes, without requiring much energy to "dislodge" it from an au-o-stable position.

Synchronization between the diversity channels is automatic: on passing from phase 1 to phase 2, if the initial convergence of an equalizer, which is independent at this time, would lead to bad synchronization (which is possible if the transmission medium is highly dispersive) the diversity coefficient computer (combiner) would eliminate the desynchronized channel (non-coherent reference) to force a new convergence to the correct position.

The elimination of a faulty channel is automatic because its weighting coefficient is set to zero. Finally, the invention assures weighting in accordance with the residual quality of a channel scrambled or distorted beyond the capacity of the equalizer.

The equalizer-combiner of the invention advantageously includes means for controlling changing from the acquisition phase to the normal operation phase assuring changing to the normal operation phase in accordance with a measured error rate on the reference information.

Computing the error rate is particularly easy and accurate because the equalizer-combiner knows the reference information (structure and location in the frame).

In one particular embodiment of the invention the means for controlling changing from the acquisition phase to the normal operation phase command independent phase change times for the equalizers and for the weighting devices.

In other words, an optional and very short intermediate phase can be provided during which the equalizers continue to operate in the acquisition mode, while weighting is already based on the analysis of the reference information.

The means for computing the weighting coefficients advantageously use the gradient algorithm to minimize the expression $|z_k-y_k|^2$ as a function of $a_i$ where:

$y_k$ is the reference information known to the receiver;

$Z_k$ is the reference information as contained in the combined signal, with:

$z_k = a_1 x_{k1} + \ldots + a_m x_{km}$, where:

m is the number of channels;

$X_{ki}$ is the reference information as contained in channel i;

$a_i$ is the weighting coefficient assigned to the channel i;

k is a temporal index.

The use of the gradient algorithm is particularly advantageous, in particular because of its simplicity and its stability.

In one preferred embodiment of the invention the equalizers use transversal filters with free complex coefficients.

The overhead imposed by the reference information is low, compared to the "reference directed" technique known in itself and previously discussed. The combiner alone requires much less precision than the combiner-equalizer combination.

A unique word is advantageously inserted into each frame of the transmitted signal at a predetermined location to synchronize the reference information.

Of course, the invention also concerns diversity receivers using equalizer-combiners as described hereinabove and the corresponding diversity reception method.

In this method, reception is on at least two receive channels each receiving a received digital signal corresponding to a unique transmitted digital signal, each of the received digital signals being equalized, demodulated and weighted separately, then grouped to form a combined signal which is subjected to a global decision to deliver a global estimate of the transmitted source signal, wherein equalization coefficients for each channel are computed in accordance with:

a first channel error signal representative of a comparison between the demodulated signal and a channel estimate of the transmitted source signal during an acquisition phase, and a second channel error signal representative of a comparison between the demodulated signal and the global estimate of the transmitted source signal during a normal operation phase, and wherein the weighting coefficients are computed in accordance with:

a first global error signal representative of a comparison between the combined signal and the global estimate of the transmitted source signal during the acquisition phase, and a second global error signal representative of a comparison between local reference information known to the receiver and corresponding received reference information periodically extracted from the global estimate during the normal operation phase.

This method advantageously includes a step of determining an error rate on the reference information and a step of commanding a change from the acquisition phase to the normal operation phase by comparing the error rate to a first predetermined threshold.

The method can equally provide an intermediate phase between the acquisition phase and the normal operation phase during which:

the equalization coefficients of each channel are computed in accordance with the first channel error signal representative of a comparison between the demodulated signal and a channel estimate of the transmitted source signal, and the weighting coefficients are computed in accordance with the second global error signal representative of a comparison between local reference information known to the receiver and received reference information extracted periodically from the global estimate.

According to one advantageous feature of the invention there is provision for passage from the normal operation phase to the acquisition phase if an error rate computed on the reference information is greater than a second predetermined threshold.

Other features and advantages of the invention will emerge from a reading of the following description of one preferred embodiment of the invention given by way of illustrative and non-illustrative example only and from the accompanying drawings.

BRIEF DESCRIPTION OF THE DRAWINGS

FIGS. 1 and 2 show two diversity receiver equalization-combination techniques known in themselves and already commented on in the preamble.

DETAILED DESCRIPTION OF THE PREFERRED EMBODIMENT

Figure 3:
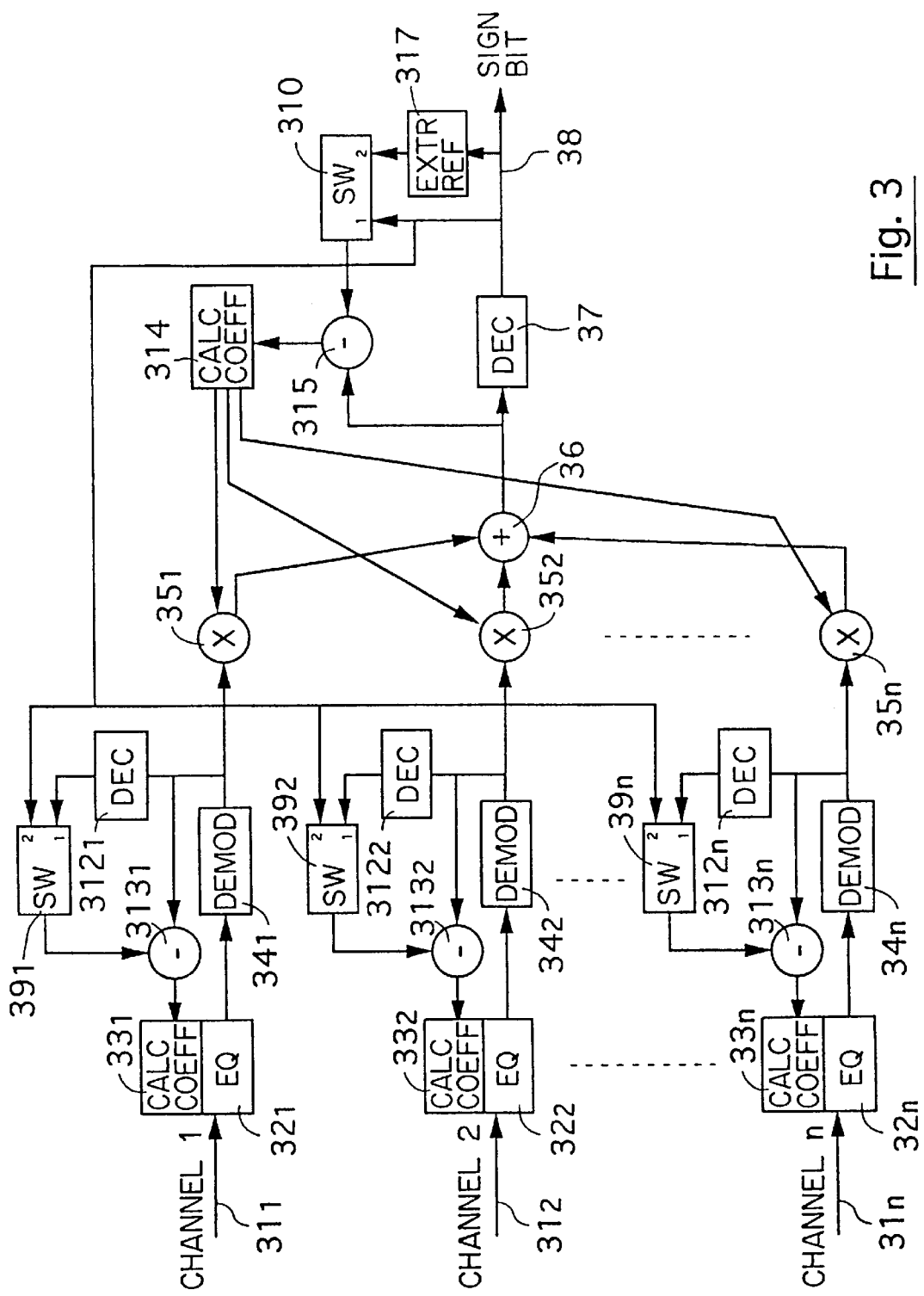
FIG. 3 shows one embodiment of an equalizer-combiner of the invention.

The preferred embodiment of the invention described hereinafter can be applied in particular to a microwave transmitter-receiver system using tropospheric scatter FIG. 3 shows the equalizer-combiner of a receiver of a system of this kind.

The signals $31_1$ through $31_n$ received on each channel (n=6, for example) feed the corresponding channel equalizer $32_1$ through $32_n$ (after transposition into the baseband in the conventional way). These equalizers can be of any appropriate type.

The equalization coefficients are supplied by modules $33_1$ through $33_n$ for computing the coefficients in accordance with data described below.

The equalized signals feed demodulators $34_1$ through $34_n$ The demodulation is of the differentially coherent type After demodulation the signals are combined. For this they are weighted (multipliers $35_1$ through $35_n$) by a weighting coefficient and then grouped by a summing device 36.

The combined signal feeds a decision module 37 which delivers a digital signal sign bit (hard decision). This information 38 is fed to the remainder of the processing (not shown).

As previously indicated, the invention uses two phases to compute the equalization and weighting coefficients. Channel switches $39_1$ through $39_n$ and two combination. Switch 310 which changes the error signal used are therefore provided.

The switches are controlled in accordance with the error rate on the received signal. The error rate is simply obtained by comparing 311 reference information known to the receiver, and therefore completely reliable, to reference information received, corresponding to the same reference information transmitted periodically (e.g. multiplexed at the transmitter with the wanted signal) using a frame structure simply enabling this period insertion.

The reference information is also used to compute the weighting coefficients in the second phase.

In the acquisition phase (switches in position 1), the equalization coefficients are computed "locally" for each channel. A demodulator $34_1$ $34_n$ feed a respective decision module $312_1$–$312_n$ which is similar to a decision module. 37 of the combiner.

The module $33_1$–$33_n$ for computing the equalization coefficients apply the gradient algorithm to a channel error signal i corresponding to a respective difference $313_1$–$313_n$ between the demodulated signal and the corresponding decision (via respective switch $39_1$–$39_n$)

At the same time, a module 314 for computing weighting coefficients is fed with the difference 315 between the combined signal and the corresponding decision (via the switch 310 in position 1).

As soon as the device is synchronized to the reference information (error rate below a predetermined threshold) the switches are switched to position 2, corresponding to the normal operation phase.

The decision on the combined signal is also fed to a module 317 for extracting the reference information. In position 2, the error signal for computing the weighting coefficients is therefore based on the difference 315 between the extracted reference information and the combined signal, acquired at the time of reception (or passage) of the reference (commanded by the reference extractor 317).

The module 314 for computing the weighting coefficients uses only the reference information. The rest of the time the coefficients do not vary.

The "reference" sequence $y_k$ known at both ends (value and position) is therefore inserted by the frame into the transmitted bit stream (small increase in bit rate: 1.5%).

At the receiver, before regeneration (on the eye), the following operations are therefore carried out:

the value $x_k$ of each of the reference bits on each diversity channel i is "intercepted": $x_{ki}$ an error measurement is carried out on each of the bits $Z_k$ Of the reference sequence after the combiner:

$Z_k = a_1 x k_1 + \ldots + a_n x k_n$, $a_i$: combination coefficients

The $Z_k$ provide a reliable image of the transmitted bit stream since they are multiplexed with it.

This error measurement feeds a computation processor that develops the gradient algorithm to minimize the mean square error $|c|^2$ in accordance with $a_i$:

$a_i(t+1) = a_i^{(t)} - \mu e_k x_{ki}$

Also, on each channel, the error is computed in phase 2 from the difference between the combined decision, thus of best quality (switch $39_i$ in position 2), and their own equalized signal.

The computation modules $33_i$ operate in the same way in both phases.

Figure 4:
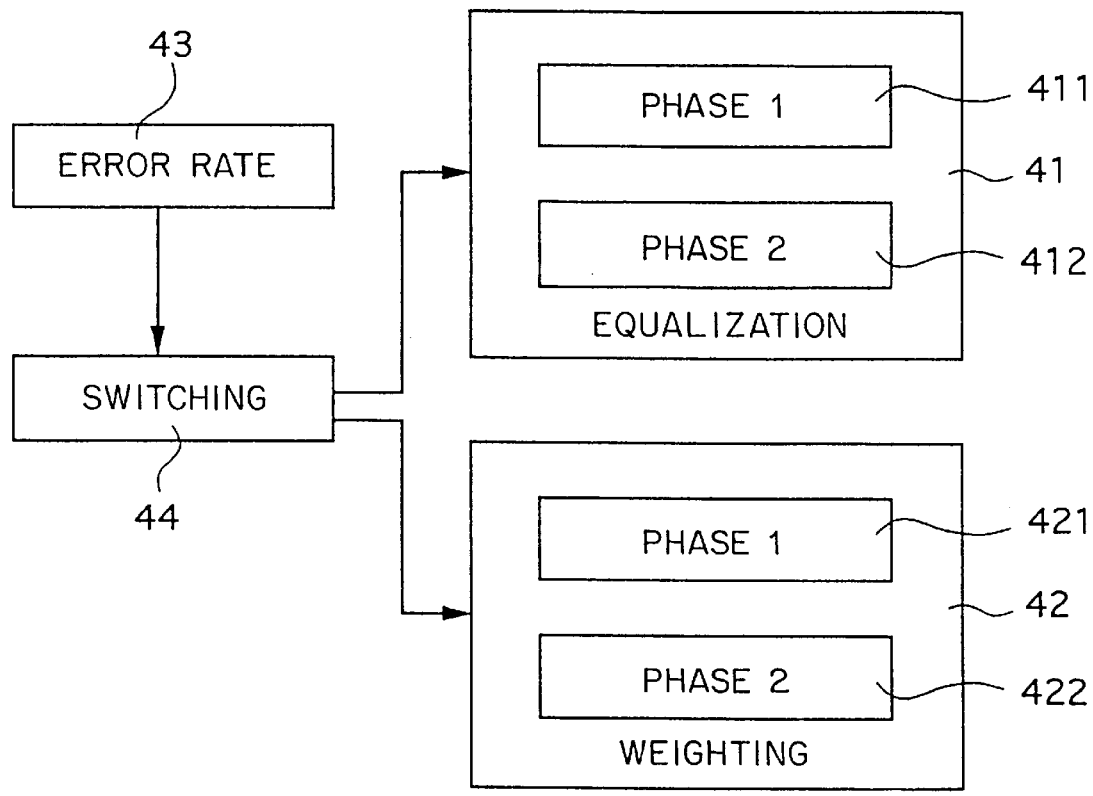
FIG. 4 is a simplified flowchart of a method in accordance with the invention implemented by the equalizer-combiner from FIG. 3.

FIG. 4 is a simplified representation of the method of the invention.

Generally speaking, the invention concerns a new approach to computing equalization coefficients 41 for each channel and computing weighting coefficients 42 for the combination.

The error rate 43 is computed by analyzing the reference signal. Beyond a predetermined threshold, the method switches 44 from the acquisition phase to the normal operation phase.

Of course, if the error rate should become highly unfavorable in the normal operation phase (above a fixed threshold), the method switches 44 to the acquisition phase to repeat the process.

It is possible for the switching to occur at different times, switching for weighting occurring slightly before switching for equalization.

As previously indicated, the invention operates in the following manner:

equalization 41:
  acquisition phase (phase 1) 411: action on local decision for each channel;
  normal operation phase (phase 2) 412: action on combined decision;
weighting 42:
  acquisition phase (phase 1) 421: action on combined decision (associated with combined signal before decision);
  normal operation phase (phase 2) 422: action on analysis of reference information.

In accordance with the invention, a "maximum quality" combination is effected. The combiner causes each channel to participate optimally. Any channel, even a bad channel, can make a positive contribution to quality.

A better signal to noise ratio is obtained. The combiner is of the "optimal" type: it maximizes the signal to noise ratio because the noise power is equal to the mean square error, which is minimized.

The invention automatically takes care of scrambling and distortion.

A channel that it is scrambled or insufficiently corrected by the equalizer (if there is one) on the input side is automatically eliminated or weighted according to what it can contribute to transmission quality, with no additional detector device (usually complicated and easily fooled).

Finally, for the same reasons as previously, the invention assures automatic elimination of faulty channels.

There is claimed:

1. A diversity receiver equalizer-combiner using at least two receive channels each receiving a received digital signal corresponding to a single transmitted digital signal, each of said receive channels including:

an equalizer controlled by means for computing equalization coefficients and delivering an equalized signal, a demodulator fed with said equalized signal and delivering a demodulated signal, and a weighting device receiving said demodulated signal and delivering a signal weighted in accordance with a weighting coefficient, said weighted signals being then combined by a diversity summing device delivering a combined signal and feeding a global estimator which delivers a global estimate of the transmitted digital signal, wherein said means for computing equalization coefficients for each of said channels allow for:

a first channel error signal representative of a comparison between said demodulated signal and a channel estimate of said transmitted digital signal, delivered by a channel estimator fed with said demodulated signal in said channel during an acquisition phase, and a second channel error signal representative of a comparison between said demodulated signal and said global estimate of said transmitted digital signal during a normal operation phase, and wherein said equalizer-combiner includes means for computing said weighting coefficients allowing for:

a first global error signal representative of a comparison between said combined signal and said global estimate of said digital signal during said acquisition phase, and a second global error signal representative of a comparison between local reference information known to said diversity receiver and corresponding received reference information periodically extracted from said global estimate during said normal operation phase.

2. An equalizer-combiner as claimed in claim 1 including means for controlling changing from said acquisition phase to said normal operation phase assuring changing to said normal operation phase in accordance with a measured error rate on said reference information.

3. The equalizer-combiner claimed in claim 2 wherein said means for controlling changing from said acquisition phase to said normal operation phase command independent phase change times for said equalizers and for said weighting devices.

4. The equalizer-combiner claimed in claim 1 wherein said means for computing said weighting coefficients use the gradient algorithm to minimize the expression $|z_k-y_k|^2$ as a function of $a_i$ where:

$y_k$ is said reference information known to said receiver;

$z_k$ is said reference information as contained in said combined signal, with:

$z_k = a_1 x_{k1} + \ldots + a_m x_{km}$, where:

m is the number of channels;

$x_{ki}$ is said reference information as contained in channel i;

$a_i$ is said weighting coefficient assigned to said channel i;

k is a temporal index.

5. The equalizer-combiner claimed in claim 1 wherein said equalizers use transversal filters with free complex coefficients.

6. An equalizer-combiner as claimed in claim 1 wherein a unique word is inserted into each frame of said transmitted digital signal at a predetermined location to synchronize said reference information.

7. A diversity receiver using an equalizer-combiner as claimed claim 1.

8. A diversity reception method on at least two receive channels each receiving a received digital signal corresponding to a unique transmitted digital signal, each of said received digital signals being equalized, demodulated and weighted separately, then grouped to form a combined signal which is subjected to a global decision to deliver a global estimate of said transmitted digital signal, wherein equalization coefficients for each channel are computed in accordance with:

a first channel error signal representative of a comparison between said demodulated signal and a channel estimate of said transmitted digital signal during an acquisition phase, and a second channel error signal representative of a comparison between said demodulated signal and said global estimate of said transmitted digital signal during a normal operation phase, and wherein said weighting coefficients are computed in accordance with:

a first global error signal representative of a comparison between said combined signal and said global estimate of said transmitted digital signal during said acquisition phase, and a second global error signal representative of a comparison between local reference information known to said diversity receiver and corresponding received reference information periodically extracted from said global estimate during said normal operation phase.

9. A method as claimed in claim 8 including a step of determining an error rate on said reference information and a step of commanding a change from said acquisition phase to said normal operation phase by comparing said error rate to a first predetermined threshold.

10. A method as claimed in claim 8 including an intermediate phase between said acquisition phase and said normal operation phase during which:

said equalization coefficients of each channel are computed in accordance with said first channel error signal representative of a comparison between said demodulated signal and a channel estimate of said transmitted digital signal, and said weighting coefficients are computed in accordance with said second global error signal representative of a comparison between local reference information known to said receiver and received reference information extracted periodically from said global estimate.

11. A method as claimed in claim 8 including passage from said normal operation phase to said acquisition phase if an error rate computed on said reference information is greater than a second predetermined threshold.

* * * * *